S. G. SWENDSON.
CUSHION TIRE.
APPLICATION FILED APR. 6, 1914.
1,122,553.
Patented Dec. 29, 1914.
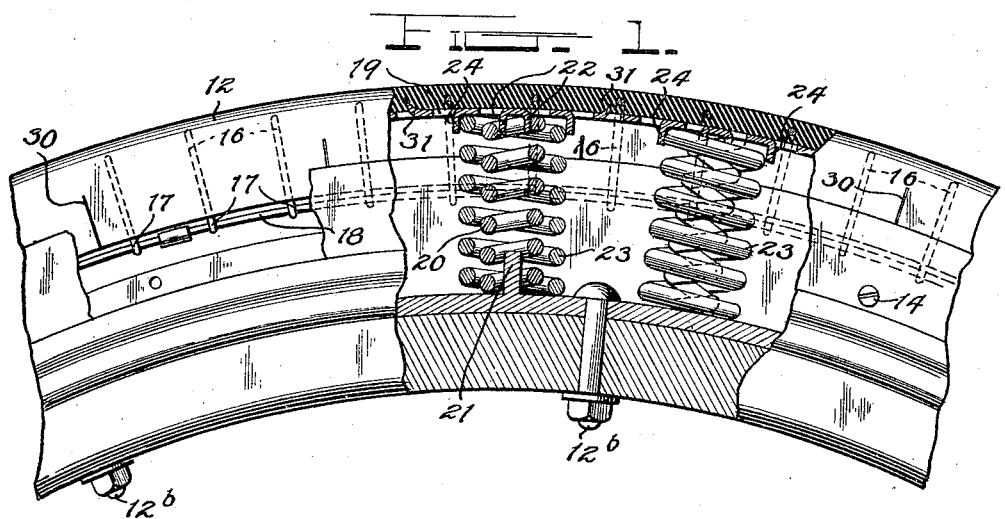
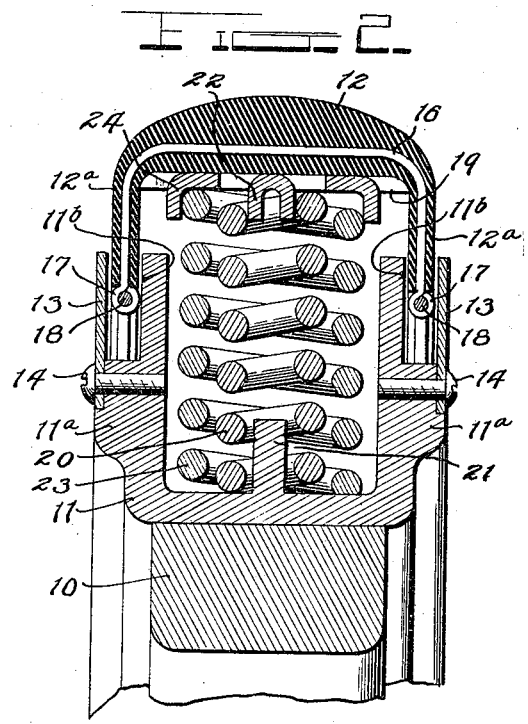
Witnesses
Harry B. Rook.
Harriett B. Cornwall.
Inventor
S. G. Swendson
By N. S. Hill
Attorney

UNITED STATES PATENT OFFICE.

SAMUEL G. SWENDSON, OF TOPEKA, KANSAS.

CUSHION-TIRE.

1,122,553.      Specification of Letters Patent.     Patented Dec. 29, 1914.

Application filed April 6, 1914. Serial No. 829,834.

*To all whom it may concern:*

Be it known that I, SAMUEL G. SWENDSON, citizen of the United States, residing at Topeka, in the county of Shawnee and State of Kansas, have invented certain new and useful Improvements in Cushion-Tires, of which the following is a specification.

The present invention relates to certain new and useful improvements in cushion tires and has for its object to provide a device of this character in which the resiliency is derived principally from metallic springs, novel features of construction being involved whereby all shocks and jars are effectively absorbed in substantially the same manner as where pneumatic tires are employed.

A further object of the invention is to provide a cushion tire which is comparatively simple and inexpensive in its construction, which has the resiliency of a pneumatic tire, which can be quickly placed in position or removed therefrom, and which is composed of strong and durable parts adapted to withstand successfully the wear and tear to which vehicle tires are ordinarily subjected when in use.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a portion of a cushion tire constructed in accordance with the invention, portions thereof being broken away and shown in section to illustrate more clearly the details of construction. Fig. 2 is an enlarged transverse sectional view through the tire.

Specifically describing the present embodiment of the invention, the numeral 10 designates the rim or felly of a wheel, and 11 a channel member which is fitted upon the rim, suitable fastening members such as the bolts 12$^b$ being provided for retaining the channel member in position. The sides 11$^a$ of the channel member 11 have the outer edges thereof rabbeted or recessed as indicated at 11$^b$ to provide clearance space for the side flanges 12$^a$ of a deformable channel tread member 12. This tread member 12 is formed of rubber, a combination of rubber and canvas, or some other suitable material and is adapted to move in and out radially with respect to the inner channel member 11 as well as to deform and give circumferentially to conform to the surface of the road.

Annular retaining rings 13 are fitted to the side flanges 11$^a$ of the inner channel member 11 and project over the rabbeted portions 11$^b$ of the said side flanges so as to coöperate therewith to provide annular guide spaces which loosely receive the side flanges 12$^a$ of the tread channel member 12. Suitable fastening means such as the screws 14 may be utilized for retaining the plates 13 in position.

The rubber deformable channel member 12 is reinforced by means of a series of U-shaped strips or wires 16, the arms of the reinforcing wires extending through the side flanges 12$^a$ of the channel member and terminating in eyes 17 which project slightly beyond the flanges and receive annular wires or tie members 18. These wires 18 are housed within the recesses provided by the side plates 13 and serve to draw inwardly upon the side flanges 12$^a$ so as to hold the latter against any tendency to spread apart.

Arranged within the channel tread member 12 is a metallic band 19 which bears against the inner face thereof and is adapted to yield as the outer channel member is deformed. Coil springs are interposed between the band 19 and the channel member 11, and in the present instance these coil springs are illustrated as arranged in concentric pairs. The inner coil spring 20 of each pair is engaged at the inner end thereof by a positioning lug 21 projecting from the base of the channel member 11, while the outer end thereof is engaged by positioning ears 22 struck up from the band 19. The outer coil spring 23 surrounds the inner coil spring 20 and is engaged at the outer end thereof by positioning lugs 24 struck up from the band 19. The coil springs normally force the outer deformable channel member 12 away from the inner channel member 11 so as to hold the former yieldably in operative position. As previously explained, however, the outer channel member 12 is adapted to be moved toward and away from the inner channel member 11, and is deformable so as to accommodate itself to the surface of the road and thereby obtain a maximum amount of resiliency.

As indicated upon Fig. 1, the sides of the channel shaped rubber tread member 12 may be provided with a series of slits 30 so that the flanges can be spread apart when assembling the member 12 and before inserting the wires 18 through the eyes 17 of the U-shaped reinforcing member 16. The band 19 may also have a series of prongs 31 stamped therefrom and bent outwardly so as to engage the rubber tread 12 and prevent creeping or transverse movement thereof upon the band.

Having thus described the invention, what I claim as new and desire to secure by Letters Patent, is:—

1. A cushion tire including an inner channel ring, an outer deformable channel ring, the flanges of the two channel rings having a sliding engagement with each other, U-shaped reinforcements embedded in the outer channel ring with the extremities thereof projecting beyond the edges of the flanges thereof, annular tie wires connecting the projecting extremities of the U-shaped reinforcements and arranged exteriorly of the channel ring, and resilient means interposed between the two channel rings.

2. A cushion tire including an inner channel ring, an outer deformable channel ring formed of rubber, the flanges of the two channel rings having a sliding engagement with each other, U-shaped reinforcements for the outer channel ring, annular tie wires connecting the ends of the U-shaped reinforcements, and resilient means interposed between the two channel rings.

In testimony whereof I affix my signature in presence of two witnesses.

SAMUEL G. SWENDSON.

Witnesses:
HELMER G. SWENDSON,
KNUT TELLJSON.

Copies of this patent may be obtained for five cents each, by addressing the "Commissioner of Patents, Washington, D. C."